(12) United States Patent
Funazukuri et al.

(10) Patent No.: US 11,188,811 B2
(45) Date of Patent: Nov. 30, 2021

(54) COMMUNICATION APPARATUS

(71) Applicant: TOYOTA JIDOSHA KABUSHIKI KAISHA, Toyota (JP)

(72) Inventors: Mina Funazukuri, Toyota (JP); Wataru Kaku, Nagoya (JP); Shintaro Yoshizawa, Nagoya (JP)

(73) Assignee: TOYOTA JIDOSHA KABUSHTKI KAISHA, Toyota (JP)

( * ) Notice: Subject to any disclaimer, the term of this patent is extended or adjusted under 35 U.S.C. 154(b) by 11 days.

(21) Appl. No.: 16/156,103

(22) Filed: Oct. 10, 2018

(65) Prior Publication Data
US 2019/0164032 A1 May 30, 2019

(30) Foreign Application Priority Data
Nov. 28, 2017 (JP) .............................. JP2017-228233

(51) Int. Cl.
G05B 15/02 (2006.01)
G06N 3/00 (2006.01)
(Continued)

(52) U.S. Cl.
CPC ............ G06N 3/008 (2013.01); B25J 9/0003 (2013.01); B25J 11/001 (2013.01);
(Continued)

(58) Field of Classification Search
CPC ..... G06N 3/008; B25J 9/0003; B25J 11/0015; B25J 11/001; G05B 15/02; G06F 3/1423;
(Continued)

(56) References Cited

U.S. PATENT DOCUMENTS 6,118,888 A * 9/2000 Chino ..................... G06F 3/011
382/118
9,636,594 B2 * 5/2017 Rehkemper .............. A63H 3/38
(Continued)

FOREIGN PATENT DOCUMENTS

JP 2004-42151 2/2004
JP 2007-181888 A 7/2007
(Continued)

OTHER PUBLICATIONS

C. Breazeal and B. Scassellati, "How to build robots that make friends and influence people," Proceedings 1999 IEEE/RSJ International Conf. on Intelligent Robots and Systems. Human and Environment Friendly Robots . . . (Cat. No. 99CH36289), Kyongju, South Korea, 1999, pp. 858-863, vol. 2 (Year: 1999).*
(Continued)

Primary Examiner — Christopher E. Everett
(74) Attorney, Agent, or Firm — Oblon, McClelland, Maier & Neustadt, L.L.P.

(57) ABSTRACT

A communication apparatus that can improve communication quality is provided. A communication apparatus including a face unit for achieving a configuration simulating right and left eyes by a mechanical movement or a display. The communication apparatus includes a detection unit configured to detect a distance to and a direction of a communication partner, and a control unit configured to control the mechanical movement or the display of the configurations in such a way that viewpoints of the right and left eyes are directed to the distance and the direction detected by the detection unit.

4 Claims, 11 Drawing Sheets

(51) Int. Cl.
    G06T 7/536    (2017.01)
    G06F 3/14     (2006.01)
    G06T 3/20     (2006.01)
    G06T 7/73     (2017.01)
    G06K 9/00     (2006.01)
    G06T 3/60     (2006.01)
    B25J 11/00    (2006.01)
    B25J 9/00     (2006.01)
    G10L 25/63    (2013.01)
    G10L 15/22    (2006.01)

(52) U.S. Cl.
    CPC .......... *B25J 11/0015* (2013.01); *G05B 15/02* (2013.01); *G06F 3/1423* (2013.01); *G06K 9/00221* (2013.01); *G06T 3/20* (2013.01); *G06T 3/60* (2013.01); *G06T 7/536* (2017.01); *G06T 7/73* (2017.01); *G06K 9/00597* (2013.01); *G06T 2207/30201* (2013.01); *G10L 15/22* (2013.01); *G10L 25/63* (2013.01)

(58) Field of Classification Search
    CPC .......... G06K 9/00597; G06K 9/00221; G06T 2207/30201; G06T 3/60; G06T 7/73; G06T 3/20; G06T 7/536; G10L 25/63; G10L 15/22
    See application file for complete search history.

(56) References Cited

U.S. PATENT DOCUMENTS

| | | | | |
|---|---|---|---|---|
| 10,062,216 | B2* | 8/2018 | Konoplev | G06T 3/0093 |
| 2004/0183749 | A1* | 9/2004 | Vertegaal | G06F 3/011 345/7 |
| 2005/0036649 | A1* | 2/2005 | Yokono | G06K 9/00221 382/100 |
| 2010/0136880 | A1* | 6/2010 | Liu | A63H 3/38 446/392 |
| 2011/0177753 | A1* | 7/2011 | Irmler | A63H 3/40 446/392 |
| 2013/0217300 | A1* | 8/2013 | Skifstrom | A63H 3/38 446/392 |
| 2014/0005806 | A1 | 1/2014 | Yamamoto et al. | |
| 2015/0314454 | A1* | 11/2015 | Breazeal | B25J 9/0003 700/259 |
| 2017/0360647 | A1* | 12/2017 | Casey | A63H 3/003 |
| 2018/0104822 | A1 | 4/2018 | Yuki et al. | |
| 2018/0366121 | A1 | 12/2018 | Funazukuri et al. | |
| 2018/0370032 | A1* | 12/2018 | Ichikawa | G06K 9/00664 |
| 2019/0279070 | A1* | 9/2019 | Hayashi | G06F 40/20 |

FOREIGN PATENT DOCUMENTS

| | | |
|---|---|---|
| JP | 2007-323150 A | 12/2007 |
| JP | 2008-18529 A | 1/2008 |
| JP | 5186723 | 4/2013 |
| JP | 2013-154458 | 8/2013 |
| JP | 2014-010605 | 1/2014 |
| JP | 2018-062042 | 4/2018 |
| JP | 2019-937 A | 1/2019 |

OTHER PUBLICATIONS

A. van Breemen et al., "A User-Interface Robot for Ambient Intelligent Environments," Proce. 1st International Workshop on Advances in Service Robotics, ASER03, Bardolino, Italy, 2003. (Year: 2003).*

T. Fong, I. Nourbakhsh, y K. Dautenhahn, "A Survey of Socially Interactive Robots: Concepts, Design, and Applications", the Robotics Institute Carnegie Mellon University, Report CMU-RI-TR-02-29, 2002. (Year: 2002).*

A. Zaraki, D. Mazzei, M. Giuliani and D. De Rossi, "Designing and Evaluating a Social Gaze-Control System for a Humanoid Robot," in IEEE Transactions on Human-Machine Systems, vol. 44, No. 2, pp. 157-168, Apr. 2014. (Year: 2014).*

Tomoko Yonezawa, Hirotake Yamazoe, Akira Utsumi, and Shinji Abe. 2007. Gaze-communicative behavior of stuffed-toy robot with joint attention and eye contact based on ambient gaze-tracking. In Proceedings of the 9th international conference on Multimodal interfaces (ICMI '07), ACM, pp. 140-145 (Year: 2007).*

Alessandro Roncone, et al., "A Cartesian 6-DoF Gaze Controller for Humanoid Robots" Robotics: Science And Systems XII, XP055584707, Jun. 18, 2016, 9 pages.

Naoki Sato, "Eye contact expression promoting spontaneous behavior by robot using atmosphere estimation", The Proceedings of the 79th National Convention of Information Processing Society of Japan, vol. 3, Mar. 16, 2017, pp. 3-509 to 3-510 (with partial English Translation).

* cited by examiner

COMMUNICATION APPARATUS

CROSS REFERENCE TO RELATED APPLICATIONS

This application is based upon and claims the benefit of priority from Japanese patent application No. 2017-228233, filed on Nov. 28, 2017, the disclosure of which is incorporated herein in its entirety by reference.

BACKGROUND

The present disclosure relates to a communication apparatus. In particular, the present disclosure relates to a communication apparatus including a face unit.

In recent years, the communication apparatuses that communicate with users have been progressively developed. One of known related arts is a technique in which a face unit is provided in a communication apparatus.

For example, Japanese Patent No. 5186723 discloses a communication apparatus (robot) including configurations corresponding to right and left eyes in a face unit. In the communication apparatus disclosed in Japanese Patent No. 5186723, each of the right and left eyes is configured to be movable upward, downward, leftward and rightward. The communication apparatus disclosed in Japanese Patent No. 5186723 uses a sensor to detect a shift angle between a front direction of the apparatus and a direction of a communication partner and move lines of sights of both right and left eyes toward the direction of the communication partner based on the detected shift angle.

Thus, the communication apparatus disclosed in Japanese Patent No. 5186723 can communicate with the communication partner with the lines of sights directed to the communication partner.

SUMMARY

However, when both the lines of sights of the right and left eyes move by the shift angle in the communication apparatus disclosed in Japanese Patent No. 5186723, the communication partner may have an unnatural impression like viewpoints of both the right and left eyes are not directed to him/her, for example, when he/she is close (e.g., in front of) the communication apparatus. For this reason, the communication apparatus disclosed in Japanese Patent No. 5186723 has room for improvement in communication quality.

The present disclosure is made in light of the above circumstances. An object of the present disclosure is to provide a communication apparatus that can improve communication quality.

An example aspect of the present disclosure is a communication apparatus including a face unit for achieving a configuration simulating right and left eyes by a mechanical movement or a display. The communication apparatus includes:

a detection unit configured to detect a distance to and a direction of a communication partner; and a control unit configured to control the mechanical movement or the display of the configuration in such a way that viewpoints of the right and left eyes are directed to the distance and the direction detected by the detection unit.

The above example aspect of the present disclosure can provide the communication apparatus that can improve communication quality.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, embodiments of the present disclosure will be described with reference to the drawings.

First Embodiment

Figure 1:
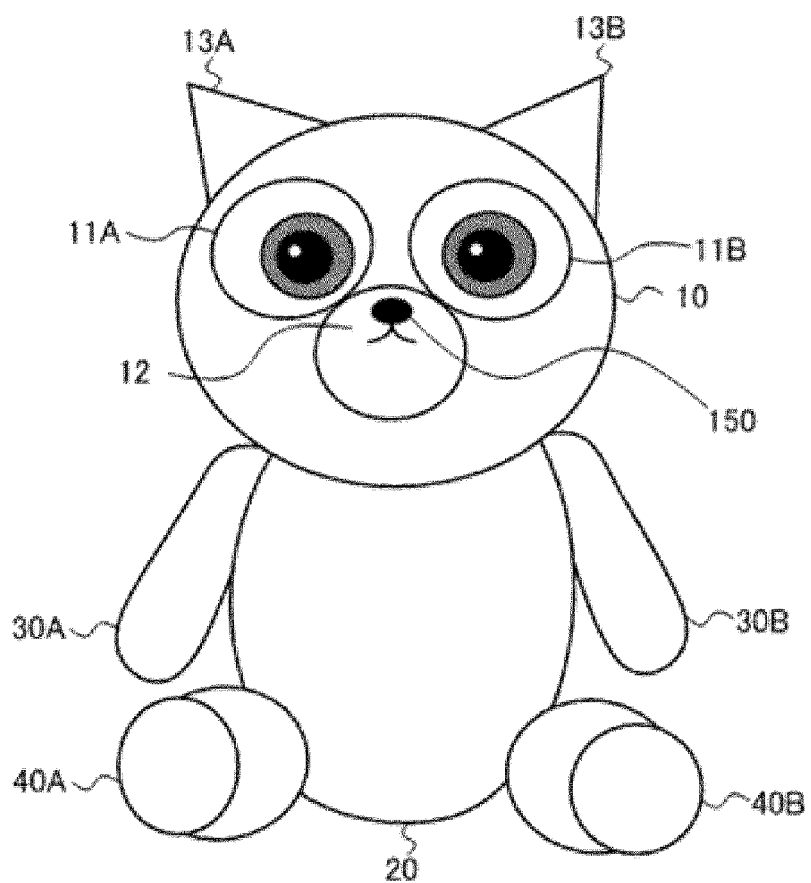
FIG. 1 is a front view showing an example of an external configuration of a communication apparatus according to a first embodiment.

FIG. 1 is a front view showing an example of an external configuration of a communication apparatus 1 according to a first embodiment. As shown in FIG. 1, the communication apparatus 1 according to the first embodiment is an apparatus (robot) having an appearance shaped like an animal. The communication apparatus 1 includes a face unit 10, a body unit 20, arm units 30A and 30B, and leg units 40A and 40B.

The face unit 10 includes displays 11A and 11B, which are eye units, a nose unit 12, and ear units 13A and 13B. The display 11A constitutes a right eye of a face of the communication apparatus 1. A display screen (display panel) of the display 11A has a size and a shape corresponding to a size and a shape of the right eye expressed in the face unit 10. Likewise, the display 11B constitutes a left eye of the face of the communication apparatus 1. A display screen (display panel) of the display 11B has a size and a shape corresponding to a size and a shape of the left eye expressed in the face unit 10. That is, in the communication apparatus 1, the entire face unit 10 is not composed of a display and instead only parts corresponding to the eyes in the face unit 10 are composed of the displays 11A and 11B. In the communication apparatus 1, the parts of the face unit 10 other than the eyes are composed of members other than a display shaped like components of the face. As described above, in the first embodiment, the parts of the face of the communication apparatus 1 other than the eyes are not composed of a display. Thus, the parts of the face other than the eyes can be composed of more realistic members. When the entire face unit 10 is formed of a display, it is difficult to provide various sensor devices such as a camera 150, which will be described later, on the face unit 10. In contract, the first embodiment achieves improved design flexibility, because the range formed of the displays is limited.

Hereinafter, the display 11A and the display 11B are referred to as simply displays 11, when they are mentioned without particular distinction between them. A display panel of the display 11 is, for example, a liquid crystal panel. However, the display 11 is not limited to this and instead a display of any other configuration may be used as the display 11.

Figure 2:
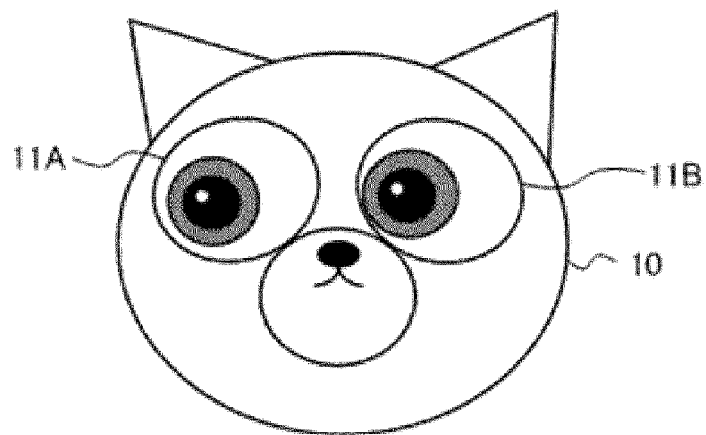
FIG. 2 is a diagram showing a display example of right and left eyes when a line of sight direction is right in the communication apparatus according to the first embodiment.

Each of the displays 11A and 11B displays an image of an eye. Thus, the display on the display 11 can express the line of sight of the communication apparatus 1 as shown in FIG. 2. FIG. 2 shows a display example of the right and left eyes when the line of sight direction is right. The image of the eye may include images of elements related to the eye such as an eyelid, an eyebrow, tears, etc. in addition to an eyeball.

In the first embodiment, the nose unit 12 protrudes forward in the face unit 10 in order to be shaped like a nose of an animal. The camera 150 functioning as an environment measurement apparatus 15, which will be described later, is provided at a protruding end of the nose unit 12. In the first embodiment, the camera 150 provided at the protruding position of the face unit 10 in this way enables overlooking around the communication apparatus 1 from the camera 150. Thus, the camera 150 can sufficiently capture the environment surrounding the communication apparatus 1.

A microphone (not shown) functioning as the environment measurement apparatus 15, which will described later, is provided at each of the ear units 13A and 13B. This microphone measures a sound of the environment surrounding the communication apparatus 1. The microphone may be provided at only one of the ear units 13A and 13B, at a part other than the ear units 13A and 13B of the face unit 10, or at a part other than the face unit 10 in the communication apparatus 1.

Figure 3:
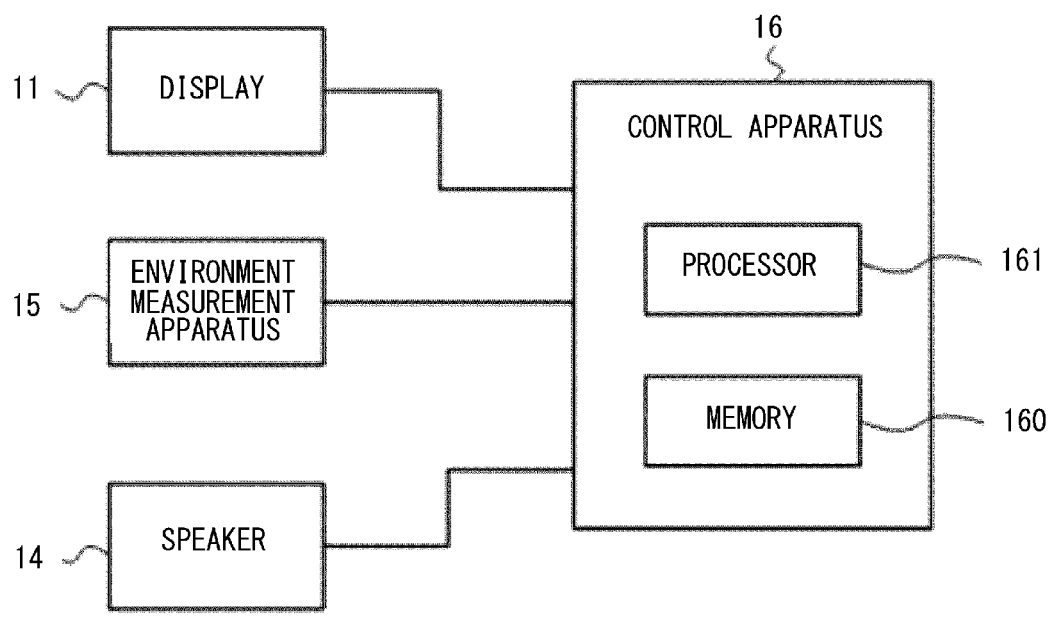
FIG. 3 is a block diagram showing an example of a hardware configuration of the communication apparatus according to the first embodiment.

Next, a hardware configuration of the communication apparatus 1 will be described. FIG. 3 is a block diagram showing an example of the hardware configuration of the communication apparatus 1. As shown in FIG. 3, the communication apparatus 1 includes the display 11, a speaker 14, the environment measurement apparatus 15, and a control apparatus 16.

The display 11 displays an image of the eyes according to the control of the control apparatus 16. The speaker 14 outputs a sound or the like according to the control of the control apparatus 16. Thus, the communication apparatus 1 can speak to the user (a communication partner).

The environment measurement apparatus 15 is an apparatus for measuring the environment surrounding the communication apparatus 1 in order to acquire information about the environment surrounding the communication apparatus 1. Specifically, the environment measurement apparatus 15 includes the camera 150 and the microphone. The environment measurement apparatus 15 outputs the measured data to the control apparatus 16. Thus, for example, the environment measurement apparatus 15 captures an image of the surrounding environment including the user. The environment measurement apparatus 15 also detects, for example, sounds uttered by the user, sound (noise) in the surrounding environment or the like. Note that the environment measurement apparatus 15 is not limited to the camera 150 and the microphone as long as it is an apparatus that can measure the surrounding environment. The environment measurement apparatus 15 may be, for example, a distance sensor such as a laser range finder that measures a distance to an object.

The control apparatus 16 includes a memory 160 and a processor 161. The memory 160 is composed of; for example, a combination of a volatile memory and a non-volatile memory. The memory 160 is used to store software (a computer program) executed by the processor 161 and the like.

This program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memory (CD-ROM), CD-R, CD-R/W, and semiconductor memories (such as mask ROM, PROM (Programmable ROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 4:
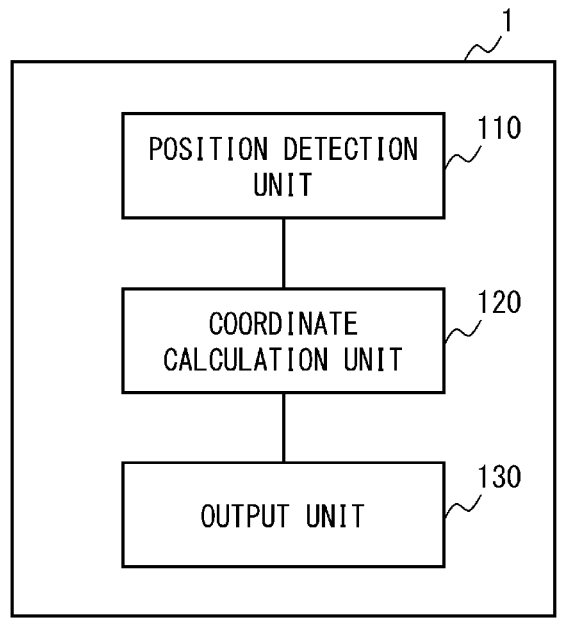
FIG. 4 is a block diagram showing an example of a software configuration of the communication apparatus according to the first embodiment.

The processor 161 performs processing of each unit shown in FIG. 4, which will be described later, by reading out the software (the computer program) from the memory 160 and executing it. In this manner, the control apparatus 16 has a function as a computer. The processor 161 may be, for example, a microprocessor, an MPU (Micro Processing Unit), or a CPU (Central Processing Unit). The processor 161 may include a plurality of processors.

Next, a configuration of the communication apparatus 1 achieved by the processor 161 executing the software will be described. FIG. 4 is a block diagram showing an example of a software configuration of the communication apparatus 1. As shown in FIG. 4, the communication apparatus 1 includes a position detection unit 110, a coordinate calculation unit 120, and an output unit 130. The coordinate calculation unit 120 and the output unit 130 are examples of components of a control unit.

The position detection unit 110 detects a position (distance and direction) of the user. The position of the user may be, for example, the center of the user's face. However, when the user's eyes can be detected, the position of the user is preferably set to the center between the user's eyes. When the position of the user is set to the center between the user's eyes, it is easy for the communication apparatus 1 to direct its line of sight to the line of sight of the user.

The coordinate calculation unit 120 calculates coordinates on the display 11A at which the right eye is displayed and coordinates on the display 11B at which the left eye is displayed in such a way that lines of sights of the right eye displayed on the display 11A and the left eye displayed on the display 11B are directed to the position (distance and direction) of the user detected by the position detection unit 110.

The output unit 130 displays the image of the right eye at the coordinates on the display 11A calculated by the coordinate calculation unit 120 and displays the image of the left eye at the coordinates on the display 11B calculated by the coordinate calculation unit 120.

Figure 5:
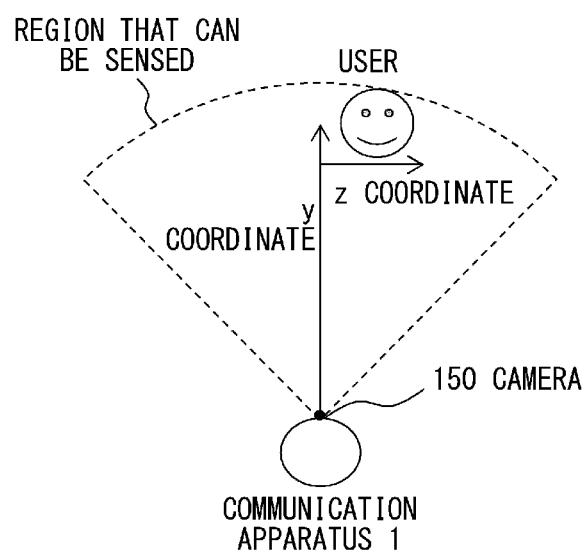
FIG. 5 is a diagram showing an example of a positional relationship between a user and the communication apparatus.
Figure 6:
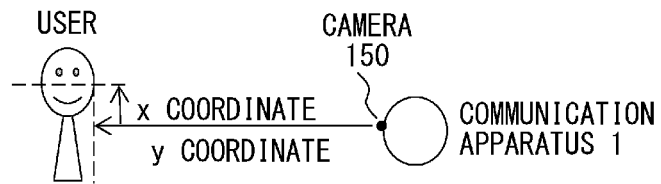
FIG. 6 is a diagram showing an example of the positional relationship between the user and the communication apparatus.

Hereinafter, the position detection unit 110 and the coordinate calculation unit 120 will be described in detail. First, the position detection unit 110 will be described. FIGS. 5 and 6 are diagrams showing an example of a positional relationship between the user and the communication apparatus 1. As shown in FIGS. 5 and 6, the position detection unit 110 measures position coordinates (x, z) of the user viewed from the communication apparatus 1 and also measures a distance coordinate (y) between the user and the communication apparatus. Only a camera image captured by the camera 150 may be used to measure these coordinates, or a sensor such as a distance sensor and a three-dimensional position measurement sensor may be used in addition to the camera 150 to measure these coordinates. The communication apparatus 1 can be used anywhere regardless of the location when the above coordinates can be measured only by a device mounted on the communication apparatus 1.

Figure 7A:
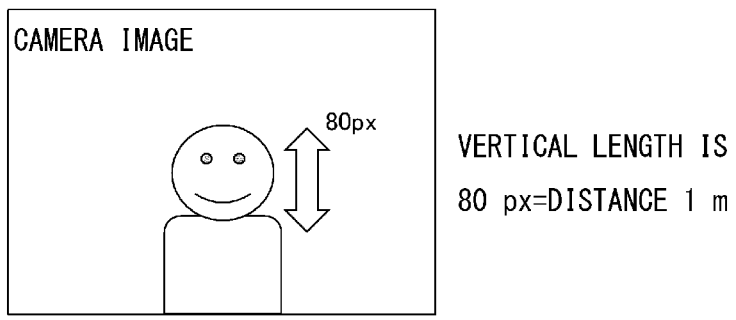
FIG. 7A is a diagram showing an example of a method for estimating a distance between the user and the communication apparatus using a face image size of the user on a camera image.
Figure 7B:
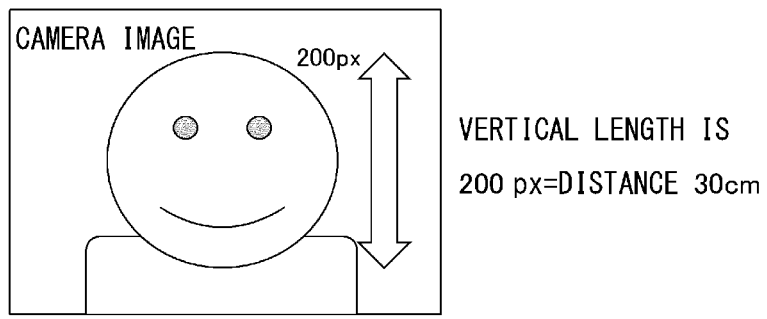
FIG. 7B is a diagram showing an example of the method for estimating the distance between the user and the communication apparatus using a face image size of the user on a camera image.

Next, a method for estimating the distance (y coordinate) between the user and the communication apparatus 1 using a face image size of the user on the camera image will be described. In this case, correlation data between a face image size of a user with an average face size (or a user who is a communication partner) on a camera image and the distance (y coordinate) is previously input. As shown in FIGS. 7A and 7B, the position detection unit 110 estimates the distance (y coordinate) to the user based on the face image size of the user on the camera image captured by the camera 150 and the previously-input correlation data. In the example of FIG. 7A, when a vertical length of the user's face on the camera image is 80 px (pixel), the distance (y coordinate) is estimated to be 1 m. In the example of FIG. 7B, when the vertical length of the user's face is 200 px (pixel), the distance (y coordinate) is estimated to be 30 cm.

Next, the coordinate calculation unit 120 will be described.

The coordinate calculation unit 120 calculates the coordinates on the display 11A at which the right eye is displayed and the coordinates on the display 11B at which the left eye is displayed in such a way that lines of sights of the right eye displayed on the display 11A and the left eye displayed on the display 11B are directed to the position (distance and direction) of the user detected by the position detection unit 110. In this case, the display positions (coordinates) on the displays 11 differ between the right and left eyes.

Figure 8:
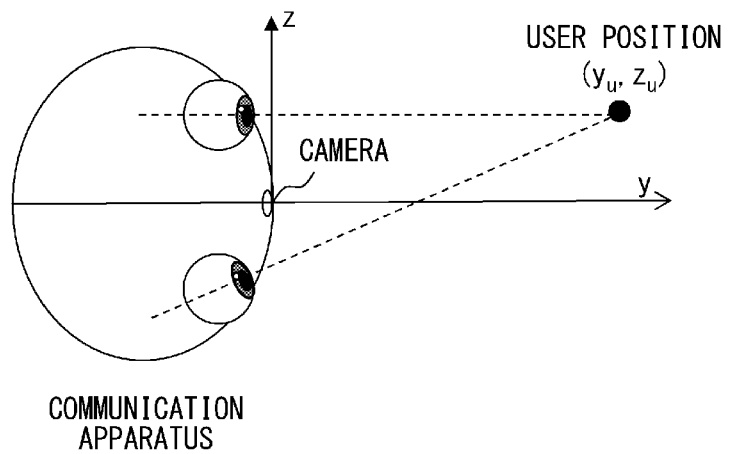
FIG. 8 is a diagram showing an example of a configuration of the communication apparatus that achieves right and left eyes with an actuator that simulates eyeballs of the right and left eyes.

The right and left eyes in the communication apparatus shown in FIG. 8 are achieved by a mechanical actuator simulating (virtualizing) eyeballs of the right and left eyes. As shown in FIG. 8, the movements of the right and left eyes differ from each other. Specifically, the eye that is more distant from the user than the other eye moves a great amount. In the example of FIG. 8, the user is located on the left side of the front of the communication apparatus. Thus, the right eye rotates a large amount so that its line of sight is directed to the position of the user.

Figure 9:
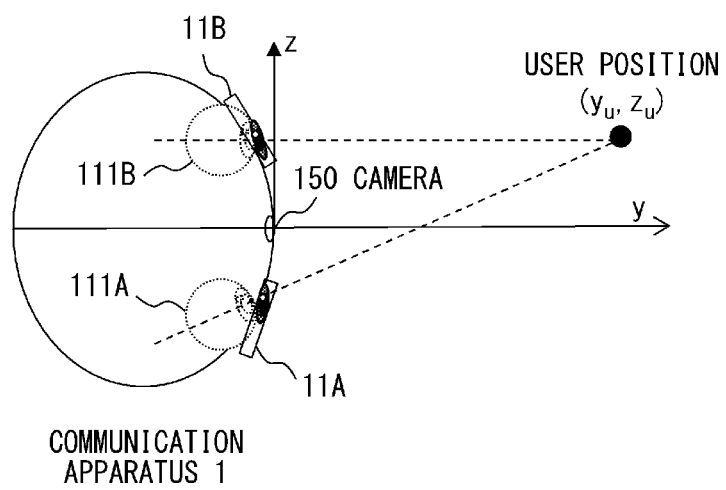
FIG. 9 is a diagram showing an example of a configuration of the communication apparatus that achieves right and left eyes by displaying configurations simulating the eyeballs of the right and left eyes on displays according to the first embodiment.

On the other hand, in the communication apparatus 1 according to the first embodiment shown in FIG. 9, the right and left eyes are achieved by displaying them on the displays 11. In this case, the lines of sights of the right and left eyes are directed to the position of the user and movements close to movements of actual human right and left eyes are achieved. In order to do so, the eyeballs of the right and left eyes are simulated (virtualized), and the display of simulated configurations 111A and 111B on the displays 11 is controlled.

Figure 10:
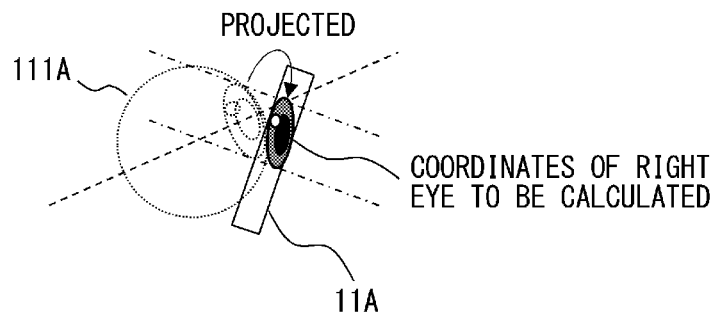
FIG. 10 is a diagram showing an example of a method for calculating coordinates of the right eye on the display in the communication apparatus according to the first embodiment.

Hereinafter, a specific control method will be described using the right eye as an example. The position detection unit 110 calculates a rotation angle of the configuration 111A when the line of sight of the configuration 111A simulating the eyeball of the right eye is directed to the position of the user. Then, as shown in FIG. 10, the coordinate calculation unit 120 calculates the position coordinates when a black eye part of the right eye of the configuration 111A disposed at the calculated rotation angle is projected on the flat display 11A as coordinates at which the black eye of the right eye is displayed on the display 11A. Then, when it is assumed that the eyeball of the right eye is present, the output unit 130 can display the black eye of the right eye at the position on the display 11A where the black eye of the right eye should move. The same control is also performed on the left eye.

When the right and left eyes are displayed on the displays 11, they can be displayed naturally if they can be projected on flat surfaces corresponding to surfaces of the eyeballs of the right and left eyes of the configurations 111A and 111B by means of lenses etc.

Next, a method for calculating the coordinates on the displays 11 at which the right and left eyes are displayed will be described in detail with reference to FIGS. 11 to 15.

Black eye coordinates ($X_{eb\text{-}right}$, $Y_{eb\text{-}right}$) of the right eye displayed on the display 11A and black eye coordinates ($X_{eb\text{-}left}$, $Y_{eb\text{-}left}$) of the left eye displayed on the display 11B are calculated in accordance with the following steps.

Step 1)

Figure 11:
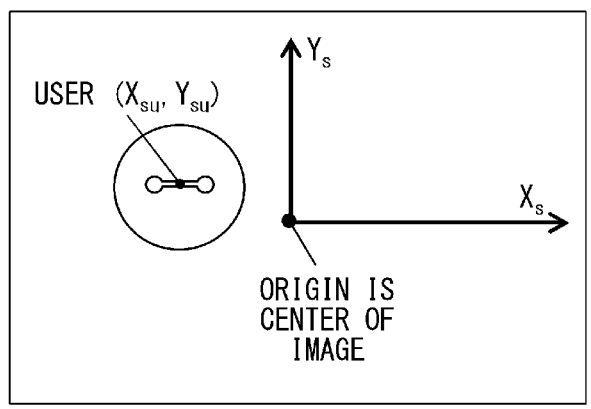
FIG. 11 is a diagram showing an example of a camera image coordinate system.
Figure 12:
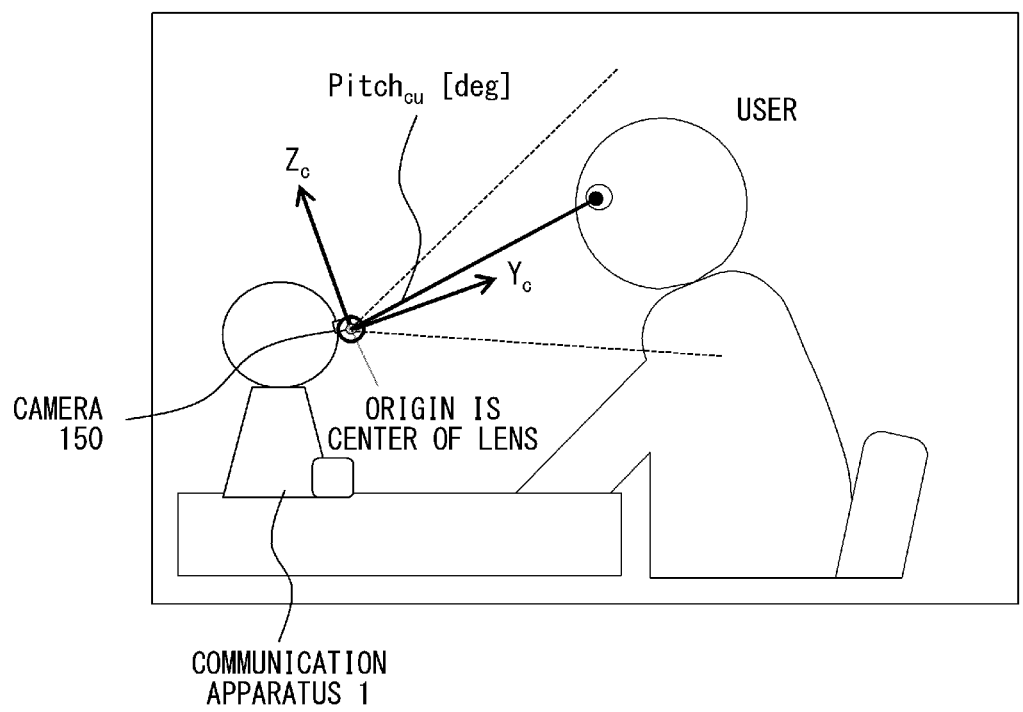
FIG. 12 is a diagram showing an example of a sensor coordinate system.
Figure 13:
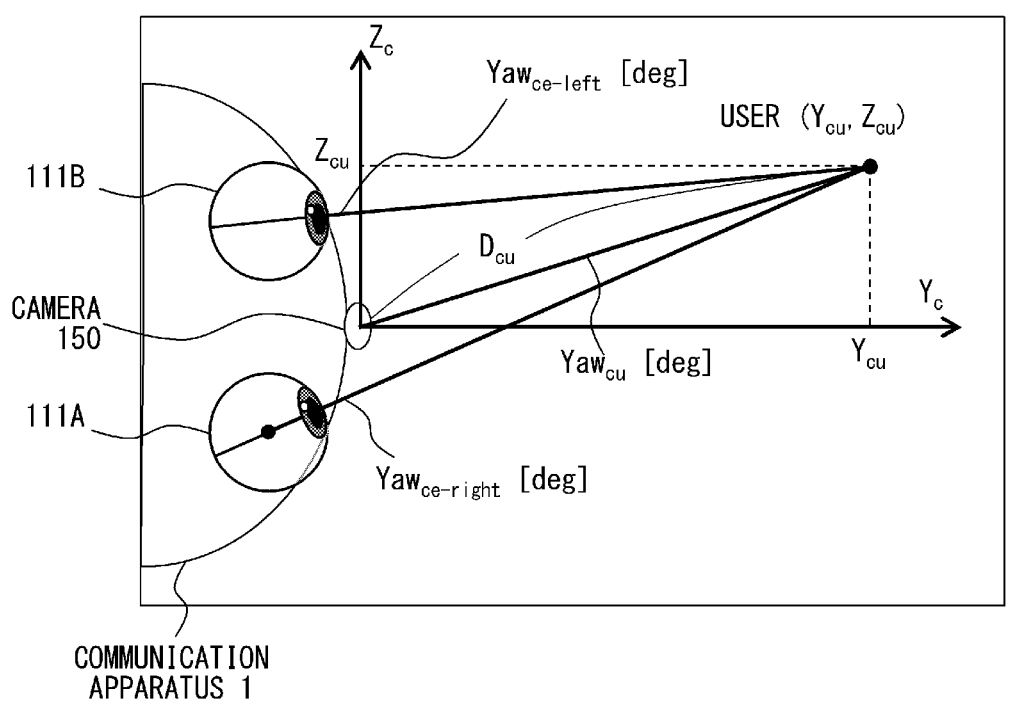
FIG. 13 is a diagram showing an example of the sensor coordinate system.

FIG. 11 shows an example of a coordinate system (hereinafter referred to as a camera image coordinate system) which is a coordinate system of a camera image captured by the camera 150 and whose origin is at a center of the camera image. FIGS. 12 and 13 show examples of a coordinate system (hereinafter referred to as a sensor coordinate system) which is a coordinate system of a region sensed by the camera 150 and whose origin is at a center of the lens of the camera 150. First, the position detection unit 110 estimates the position ($X_{su}$, $Y_{su}$) of the user in the camera image coordinate system (see FIG. 11). In this case, the position of the user is the center between the eyes. Further, the user is located on the left side of the front of the communication apparatus 1.

Next, the position detection unit 110 estimates an azimuth direction (Pitch$_{cu}$, Yaw$_{cu}$) of the user in the sensor coordinate system as follows using the position ($X_{su}$, $Y_{su}$) of the user in the camera image coordinate system and an angle of view specification of the camera 150 (see FIGS. 12 and 13).

$$\text{Pitch}_{cu} = -(\text{angle of view in the vertical direction}/2) \times Y_{su}/(\text{vertical resolution of the camera image}/2)$$

$$\text{Yaw}_{cu} = -(\text{angle of view in the horizontal direction}/2) \times X_{su}/(\text{horizontal resolution of the camera image}/2)$$

Step 2)

Figure 14:
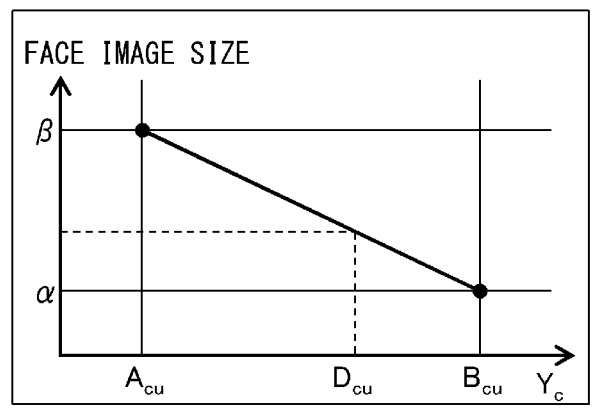
FIG. 14 is a diagram showing a method for estimating a distance between the user and the communication apparatus using a face image size of the user on a camera image.

FIG. 14 is a diagram showing an example of a method for estimating the distance ($D_{cu}$) between the user and the communication apparatus 1 using the face image size of the user on the camera image. The correlation data between the face image size of the user on the camera image and the distance is previously input to the position detection unit 110 (see FIG. 14). $\alpha$, $\beta$, $A_{cu}$, $B_{cu}$ in FIG. 14 are parameters obtained by an actual device. Then, the position detection unit 110 estimates the distance ($D_{cu}$) between the user and the communication apparatus 1 based on the face image size of the user on the camera image captured by the camera 150 and the previously-input correlation data. The face image size of the user may be estimated from the camera image or may be acquired by face recognition software.

Next, the position detection unit 110 estimates the position ($Y_{cu}$, $Z_{cu}$) of the user in the sensor coordinate system using the azimuth direction (Pitch$_{cu}$, Yaw$_{cu}$) of the user in the sensor coordinate system and the distance between the user and the communication apparatus 1 ($D_{cu}$) (See FIG. 13).

Step 3)

Next, the position detection unit 110 calculates a rotation angle Yaw$_{ce-right}$ of the configuration 111A simulating the eyeball of the right eye using the position ($Y_{cu}$, $Z_{cu}$) of the user, and also calculates a rotation angle Yaw$_{ce-left}$ of the configuration 111B simulating the eyeball of the left eye using the position ($Y_{cu}$, $Z_{cu}$) of the user (see FIG. 13).

Step 4)

Figure 15:
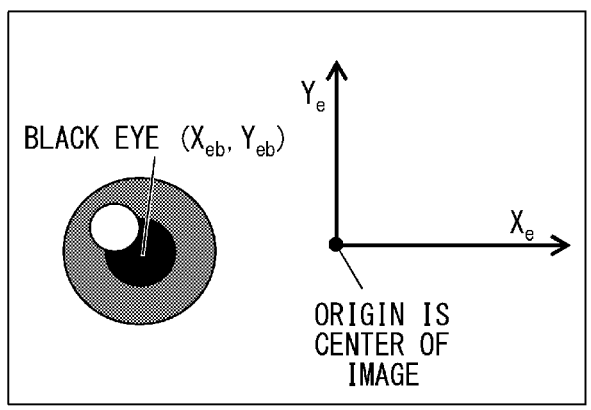
FIG. 15 is a diagram showing an example of a display image coordinate system.

FIG. 15 shows an example of a coordinate system (hereinafter referred to as a display image coordinate system) which is a coordinate system of a display image displayed on the display 11 and whose origin is at a center of the display image.

After that, the coordinate calculation unit 120 calculates, using the rotation angle Pitch$_{cu}$ and Yaw$_{ce-right}$, the position coordinates when the black eye part of the configuration 111A of the right eye disposed at the rotation angle Pitch$_{cu}$ and Yaw$_{ce-right}$ is projected on the display 11A as black eye coordinates ($X_{eb-right}$, $Y_{eb-right}$) of the right eye on the display 11A. Further, the coordinate calculation unit 120 calculates, using the rotation angle Pitch$_{cu}$ and Yaw$_{ce-left}$, the position coordinates when the black eye part of the configuration 111B of the left eye disposed at the rotation angle Pitch$_{cu}$ and Y$_{ce-left}$ is projected on the display 11B as black eye coordinates ($X_{eb-left}$, $Y_{eb-left}$) of the left eye on the display 11B (see FIG. 15).

As described above, according to the first embodiment, the face unit 10 that achieves the configurations 111A and 111B simulating the eyeballs of the right and left eyes by displaying them on the displays 11A and 11B, respectively, is included. Then, the distance and direction of the user are detected, and the displays of the configurations 111A and 111B simulating the right and left eyes are controlled in such a way that the viewpoints of the right and left eyes are directed to the detected distance and direction.

In this way, the viewpoints of the right and left eyes are individually controlled. Thus, the closer the distance to the user, the narrower the distance between the lines of sights of the right and left eyes, thereby reducing an unnatural impression such that the viewpoints of the right and left eyes are not directed to the user. This improves communication quality.

In addition, as the expression of the communication apparatus 1 changes according to the positional relationship between the communication apparatus 1 and the user, the user is less likely to be bored of communication with the communication apparatus 1. Moreover, the user can be notified that the communication apparatus 1 recognizes the behavior of the user.

Second Embodiment

Figure 16:
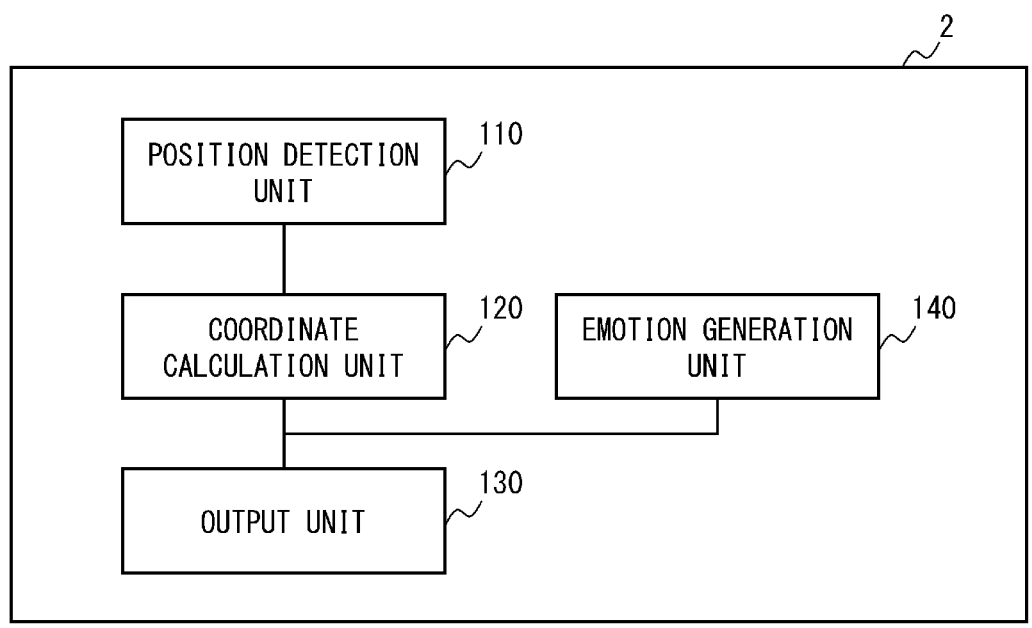
FIG. 16 is a block diagram showing an example of a software configuration of a communication apparatus according to a second embodiment.

FIG. 16 is a block diagram showing an example of a software configuration of a communication apparatus 2 according to a second embodiment. As shown in FIG. 16, the communication apparatus 2 differs from the communication apparatus 1 according to the first embodiment in that it further includes an emotion generation unit 140. An appearance configuration and a hardware configuration of the communication apparatus 2 are the same as those of the communication apparatus 1 according to the first embodiment. Thus, the description thereof will be omitted.

The emotion generation unit 140 generates an emotion (specifically, a parameter indicating an emotion) of the communication apparatus 2 expressed in the face unit 10 in accordance with a predetermined rule. The emotion is generated by the emotion generation unit 140. The emotion expressed in the expression of the face unit 10 displayed on the displays 11 can inform the user of a feeling or a state of the communication apparatus 2. This helps facilitate the communication. This also prevents the user from being bored of the communication apparatus 2. Examples of the above predetermined rule include the following rules. However, the rules are not limited to the following rules.

A first rule is to estimate the user's emotion from the user's face acquired from the image captured by the camera 150, and generate an emotion empathetic with the estimated emotion as the emotion of the communication apparatus 2. That is, in this case, the emotion generation unit 140 generates the emotion according to the user's face. This makes it possible to display the emotions according to the emotion of the user. Thus, it is possible to achieve natural communication with the user. Note that the emotion can be estimated, for example, by pattern matching between a predetermined face image and the image captured by the camera 150.

A second rule is to analyze a voice detected by the microphone, evaluate a content of a dialogue with the user, estimate an emotion of a partner from the evaluated dialogue content, and generate an emotion empathetic with the estimated emotion as the emotion of the communication apparatus 2. That is, in this case, the emotion generation unit 140 generates the emotion according to the dialogue content. This makes it possible to display the emotions according to the dialogue content. Thus, it is possible to achieve natural communication with the user. The emotion can be estimated by, for example, pattern matching between a predetermined conversation content and a dialogue content.

A third rule is to generate a spontaneous emotion from an internal state of the communication apparatus 2. That is, in this case, the emotion generation unit 140 generates the emotion according to the internal state. Thus, the spontaneous emotion can be displayed. The internal state is, for example, an amount of reduction in the remaining battery for supplying power to the communication apparatus 2, and a continuous use time of the communication apparatus 2. For example, the emotion generation unit 140 may generate the emotion such as fatigue according to the internal state.

A fourth rule is to generate an emotion of the communication apparatus 2 based on the user's action (behavior, hand gesture, etc.) acquired from the image captured by the camera 150. For example, an emotion previously associated with a predetermined action is generated under this rule. That is, in this case, the emotion generation unit 140 generates the emotion according to the action of the user. This makes it possible to display the emotions responsive to the action of the user.

In the second embodiment, the displays of the configurations 111A and 111B simulating the right and left eyes are controlled in such a way that the emotion generated for the face unit 10 is expressed. This control is executed while the viewpoints of the right and left eyes are directed to the position (distance and direction) of the user.

Figure 17:
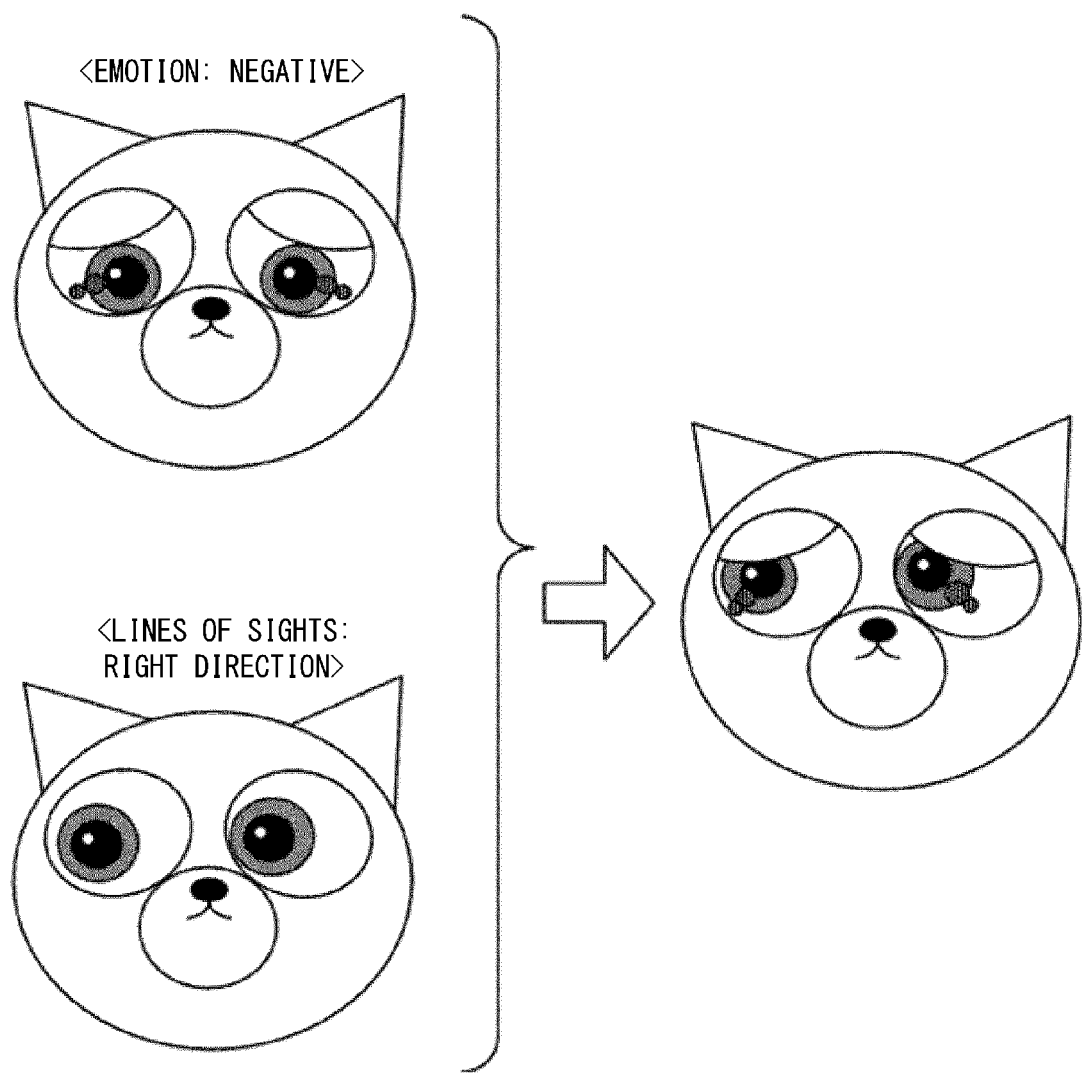
FIG. 17 is a diagram showing a display example of right and left eyes when a line of sight direction is right and an emotion is negative in the communication apparatus according to the second embodiment.

FIG. 17 shows a display example of the right and left eyes when the emotion generated by the emotion generation unit 140 is "negative", and the coordinates calculated by the coordinate calculation unit 120 are those when the line of sight direction is right. In this case, the output unit 130 displays images of crying eyes facing toward the right direction on the displays 11.

As described above, according to the second embodiment, the displays of the configurations 111A and 111B simulating the right and left eyes are controlled in such a way that the emotion generated for the face unit 10 is expressed while the viewpoints of the right and left eyes are directed to the position (distance and direction) of the user.

For example, it may be possible to express the emotions such as joy and sadness on the face unit 10 according to a predetermined pattern of preset display animation. However, expression of the emotions in this way could give an unnatural impression to the user when the direction of the lines of sights of the right and left eyes adjusted according to the distance to the user differs from the direction of the lines of sights defined by the above pattern, which results in discontinuously changing the direction of the lines of sights.

In contrast, in the second embodiment, the emotion of the face unit 10 is expressed while the viewpoints of the right and left eyes are directed to the distance and direction of the user. Thus the emotion expressed on the face unit 10 can be smoothly achieved without an unnatural impression.

Note that the present disclosure is not limited to the above-described embodiments and can be appropriately changed without departing from the spirit of the present disclosure.

For example, the communication apparatus according to the above embodiments is achieved by displaying the configurations simulating the right and left eyes on the displays. However, the present disclosure is not limited to this. As shown in FIG. 8, the right and left eyes of the communication apparatus according to the present disclosure may be achieved by the mechanical actuator simulating the right and left eyes. In this case, the mechanical movements of the actuator are controlled in such a way that the viewpoints of the right and left eyes are directed to the position (distance and direction) of the communication partner. Well known control such as motor control may be performed to control the actuator.

Further, all of the processing of the communication apparatus according to the above embodiments may be executed by the communication apparatus. Alternatively, an external server and the communication apparatus may communicate, and a part or all of the processing of the communication apparatus may be executed by the external server.

The advantages of delegating processing to the external server are as follows.

The processing of the communication apparatus can be reduced, and thus the communication apparatus can be smaller and lighter The processing capability of the external server side can be enhanced to make complicated responses Maintenance such as updating becomes easy (whereas for the maintenance and updating of the communication apparatus, a maintenance person needs to travel to the place where the communication apparatus is located)

A large amount of data such as expression images can be held in the external server.

On the other hand, the advantages of the communication apparatus executing all the processing are as follows.

The speed to respond to the user can be increased, thereby improving immediacy

Performance that does not depend on the communication status with the external server can be exhibited (dialogue performance stays the same even in places where radio waves are weak and the communication apparatus cannot communicate with the external server).

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A communication apparatus, comprising:
    a face including at least a right display to display a right eye and a left display to display a left eye;
    a nose disposed on the face and including a camera to capture an image, the nose protruding from the face; and
    circuitry configured to:
        detect a location of a communication partner based on the image and relative to a camera image coordinate system centered on the nose;
        estimate a position of a face of the communication partner in the camera image coordinate system centered on the nose;
        estimate an azimuth direction of the communication partner in a sensor coordinate system based upon the position of the face of the communication partner in the camera image coordinate system centered on the nose and an angle of view of the camera;
        estimate a distance to the communication partner based on face image size of the the communication partner and a correlation between average face sizes and distances;

estimate the position of the face of the communication partner in the sensor coordinate system based upon the azimuth direction of the communication partner in the sensor coordinate system and the distance to the communication partner;

calculate rotation angles of a configuration simulating the right and left eyes based upon the position of the face of the communication partner in the sensor coordinate system; and individually control the right display and the left display to direct viewpoints of the right and left eyes to the location of the communication partner by calculating black eye projection coordinates of the configuration simulating the right and left eyes based upon the rotation angles and the azimuth direction in the sensor coordinate system.

2. The communication apparatus according to claim 1, wherein the circuitry is configured to:

generate an emotion of the communication apparatus expressed in the face in accordance with a predetermined rule, and control the face in such a way that the emotion is expressed in the face while the viewpoints of the right and left eyes are directed to the distance and the direction.

3. The communication apparatus according to claim 1, wherein the face further includes ears disposed at sides thereof, and each of the ears includes a microphone.

4. The communication apparatus according to claim 3, wherein the circuitry is configured to generate an emotion of the communication apparatus expressed in the face based on a dialogue with the user.

* * * * *

UNITED STATES PATENT AND TRADEMARK OFFICE
CERTIFICATE OF CORRECTION

PATENT NO. : 11,188,811 B2
APPLICATION NO. : 16/156103
DATED : November 30, 2021
INVENTOR(S) : Mina Funazukuri et al.

It is certified that error appears in the above-identified patent and that said Letters Patent is hereby corrected as shown below:

On the Title Page

Item (73), the Assignee's name should read:
--(73) Assignee: TOYOTA JIDOSHA KABUSHIKI KAISHA, Toyota (JP)--

Signed and Sealed this
First Day of March, 2022

Drew Hirshfeld
*Performing the Functions and Duties of the
Under Secretary of Commerce for Intellectual Property and
Director of the United States Patent and Trademark Office*